United States Patent [19]
Christenson

[11] 3,946,802
[45] Mar. 30, 1976

[54] METHOD AND APPARATUS FOR HEAT RECOVERY

[76] Inventor: Rune Christenson, Varbacken 1, 13100 Nacka, Sweden

[22] Filed: Oct. 8, 1974

[21] Appl. No.: 513,031

[30] Foreign Application Priority Data
Oct. 9, 1973 Sweden................................ 7313697

[52] U.S. Cl. ............................ 165/35; 4/10; 4/192; 126/362; 137/337
[51] Int. Cl.²......................................... G05D 23/00
[58] Field of Search .......... 165/34, 35, 40; 126/362; 237/8 BP, 63, 19; 4/191, 192, 10, 167; 137/337

[56] References Cited
UNITED STATES PATENTS

| | | |
|---|---|---|
| 2,245,967 | 6/1941 | Dillon ................................ 126/362 |
| 3,397,841 | 8/1968 | Kieslich .................................. 237/8 |
| 3,398,891 | 8/1968 | Horne .................................. 165/35 |
| 3,705,574 | 12/1972 | Duncan .............................. 126/362 |

*Primary Examiner*—Charles J. Myhre
*Assistant Examiner*—Daniel J. O'Connor
*Attorney, Agent, or Firm*—Albert L. Jeffers; Roger M. Rickert

[57] ABSTRACT

A method and apparatus for a recovery of heat in connection with water and waste pipe systems of the kind wherein a supply pipe for supplying cold water to a water heater and a waste pipe which is supplied with waste water from different consumption points by using the waste water for preheating the cold water before the cold water is supplied to the water heater.

5 Claims, 1 Drawing Figure

U.S. Patent   March 30, 1976   3,946,802
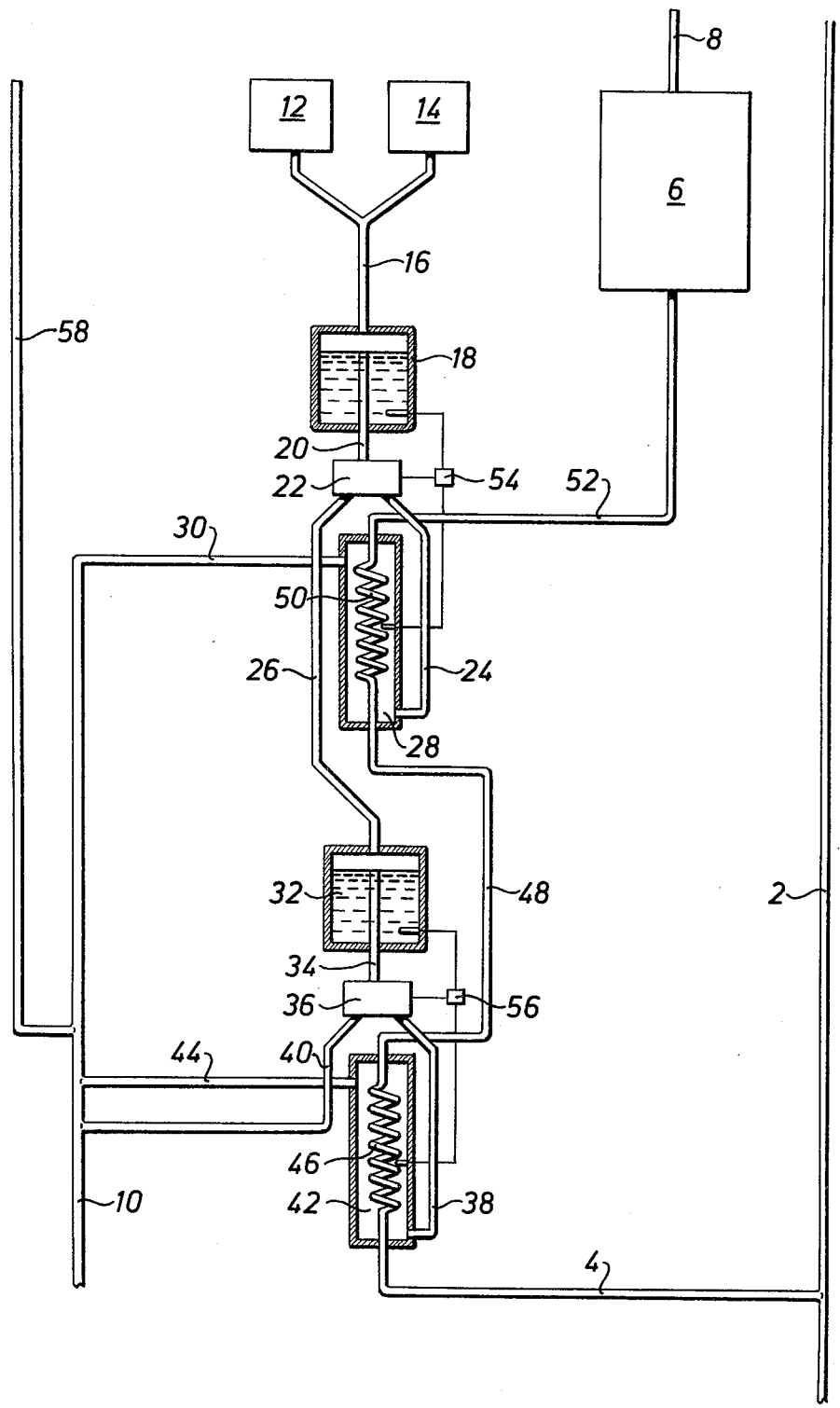

METHOD AND APPARATUS FOR HEAT RECOVERY

BACKGROUND OF THE INVENTION

FIELD OF THE INVENTION

The present invention relates to a method and an apparatus for recovering heat in water and waste pipe systems, preferably in dwelling houses.

The great waste of the energy resources of the earth has recently been noticed, and it has become a very urgent purpose to reduce this waste. Economy with the energy resources is based on a recovery and re-use of the consumed resources.

In this connection the recovery of heat is of great importance, as this recovery can provide for a substantial saving of the resources which are required for generating the heat, for example oil, water power and nuclear power. A reduction of the consumption of these energy resources provides for a reduction of the costs as well as a reduction of the pollution of the environments, which accompanies the consumption of the energy resources.

The invention is based on the idea of using the heat contents of waste water from for example washing and dishing machines, which including its great heat contents has hitherto been supplied directly to the waste pipe system.

SUMMARY OF THE INVENTION

In accordance therewith the method according to the invention provides for a recovery of heat in connection with water and waste pipe systems of the kind comprising a supply pipe for supplying cold water to a water heater and a waste pipe which is supplied with waste water from different consumption points by using the waste water for preheating the cold water before the cold water is supplied to the water heater. This preheating is accomplished in a heat exchanger which is supplied with the waste water as well as the cold water from the supply pipe before the cold water is supplied to the water heater.

In accordance with the invention the relationship between the temperature of the waste water already present in the heat exchanger and the termperature of the waste water escaping from the consumption points is determined, the waste water escaping from the consumption points being conducted to the heat exchanger only if the temperature of the escaping waste water is higher than the temperature of the waste water already present in the heat exchanger. Otherwise the escaping waste water is directed past the heat exchanger.

The waste water which by-passes the heat exchanger can be supplied directly to the final waste pipe or can be supplied to a further heat exchanger in which the temperature of the waste water is in the same way compared with the temperature of the waste water already present in the further heat exchanger and the waste water in accordance with the same principles as in the first mentioned heat exchanger either is supplied to the further heat exchanger or is supplied to the final waste pipe.

Of course it is possible to make use of a desired number of heat exchangers.

The invention also comprises an apparatus for providing a preheating of cold water by means of waste water before the cold water is supplied to a water heater in accordance with the method defined above.

BRIEF DESCRIPTION OF THE DRAWING

The invention is further described with reference to the drawing schematically showing an apparatus according to the invention.

DESCRIPTION OF THE PREFERRED EMBODIMENT

The apparatus shown in the drawing is adapted to be installed in a dwelling house in which the water and waste pipe systems comprise a main supply pipe 2 for cold water and a branch pipe 4 supplying cold water to a water heater 6. The water heater 6 is provided with supply pipe 8 for hot water extending to different consumption points. Further the system comprises a waste water pipe 10 through which waste water from the different consumption points leaves the house. In a conventional water and waste pipe system in dwelling houses the waste water leaving the house through the waste water pipe 10 often has a high temperature, especially when the waste water emanates from dishing and washing machines.

The object of the apparatus according to the invention is to take advantage of the heat of the waste water and use this heat for preheating the water which is supplied to the water heater to be heated therein.

Waste water from consumption points where the waste water has a relatively high temperature, for example dishing machines, washing machines, bath tubs, kitchen sewages and the like which in the drawing have reference numerals 12 and 14, is directed to a common waste pipe 16 extending to a collecting receptacle 18. To the receptacle 18 there is connected a discharge pipe 20 which extends up into the collecting receptacle 18 for constituting an overflow therein maintaining a constant water level in the receptacle. The pipe 20 extends to a threeway valve 22 from which the waste water can be directed either to pipe 24 or to pipe 26. The pipe 26 conducts the waste water to the lower end of a heat exchanger 28. The waste water escapes from the heat exchanger 28 at the upper end thereof through a pipe 30 after having circulated through the heat exchanger.

The pipe 26 conducts the waste water to a collecting receptacle 32 of the same kind as the receptacle 18. Thus, the collecting receptacle 32 has a discharge pipe 34 constituting an overflow and extending to a three-way valve 36 which directs the water either to a pipe 38 or to a pipe 40. The pipe 38 conducts the waste water to the lower end of heat exchanger 42 which has at its upper end a discharge pipe 44 for waste water which has been circulated through the heat exchanger. The pipe 44 conducts the waste water supplied thereto to the final waste pipe 10. Also the pipe 40 conducts waste water supplied to this pipe to the final waste pipe 10.

Cold water from the main supply pipe 2 is supplied to the heat exchanger 42 through the branch pipe 4. In the heat exchanger the water absorbs heat from the waste water present in the heat exchanger 42 by being circulated through a heat exchanger coil 46. From the heat exchanger coil 46 the water is conducted through a pipe 48 to the heat exchanger 28 wherein the water circulates through a heat exchanger coil 50 and is further heated by the waste water present in the heat exchanger 28.

From the heat exchanger 28 the water is conducted through pipe 52 to the conventional water heater 6 to be heated to its final temperature and to be supplied to the consumption points through the pipe 8.

In order to provide for the best possible exchange of heat the supplying of the waste water to the heat exchangers is controlled by means of a detector device 54 detecting the difference in the temperature of the waste water in the receptacle 18 and in the heat exchanger 28 and a detector device 56 detecting the difference in the temperature of the waste water in the receptacle 32 and in the heat exchanger 42. In the case that the waste water which is supplied to the collecting receptacle 18 from any of the consumption points 12 and 14 has a higher temperature than the waste water in the heat exchanger 28 the detector device 54 positions the three-way valve 22 so that the waste water is supplied to the heat exchanger 28 in order to raise the temperature therein. However, if the waste water supplied to the receptacle 18 from any of the consumption points 12 and 14 has a lower temperature than the waste water in the heat exchanger 28 the detector device 54 positions the three-way valve 22 so that the waste water is supplied to the pipe 26 and by-passes the heat exchanger 28 to the collecting receptacle 32. In this receptacle there is provided a corresponding determination of the difference between the temperature of the waste water supplied to the receptacle 32 and the temperature of the waste water in the heat exchanger 42. Thus, if the temperature of the waste supplied to the receptacle 32 is higher than the temperature of the waste water in the heat exchanger 42, the waste water is supplied to the heat exchanger 42 for raising the temperature therein. However, if the waste water supplied to the receptacle 32 has a lower temperature than the temperature of the waste water in the heat exchanger 42, the waste water is conducted from the receptacle 32 to the pipe 40 to be supplied to the final waste water pipe 10.

In this way the heat exchanger 28 will work at a higher temperature than the heat exchanger 42 and the cold water from the pipe 4 will be heated step by step in the heat exchangers before the water is supplied to the water heater 6.

Of course it is possible to provide the plant with the desired number of heat exchangers without departing from the principle of the invention.

It is also possible to modify the apparatus shown in the drawing so that the waste water from the discharge pipe 30 is supplied from the heat exchanger 21 to the heat exchanger 42 by means of a three-way valve and a further pipe and by comparing the temperature of the waste water in the pipe 30 with the temperature of the waste water in the heat exchanger 42 to determine if the waste water from the pipe 30 shall be supplied to the heat exchanger 42 to raise the temperature therein or shall be supplied directly to the final waste pipe 10. It is also possible to connect the discharge pipe 30 with the pipe 26 for conducting waste water from the heat exchanger 22 to the collecting receptacle 32 from which the waste water according to the principles described above is supplied either to the heat exchanger 42 or to the final waste pipe 10 through the pipe 40.

It is suitable to use in the apparatus a separate waste pipe which is positioned wholly outside the heat exchanging system for waste points which are normally not supplied with waste water having a higher temperature. In the drawing this is represented by the pipe 58 which is connected with for examples toilets.

The invention can be modified within the scope of the following claims.

I claim:

1. Apparatus for recovering heat in water and waste pipe systems, comprising a main supply pipe for cold water, a water heater supplied with water from said supply pipe, a waste pipe which is supplied with waste water from different consumption points and a heat exchanger which is connected with the waste water pipe and is connected between said supply pipe for cold water and the water heater for providing a preheating of the cold water by means of the waste water before the cold water is supplied to the water heater, wherein the apparatus is provided with a branching point before the heat exchanger, from which a first pipe extends to the heat exchanger and a second pipe extends past the heat exchanger and the apparatus comprises a detector and control device for determining the relationship between the temperature of the waste water escaping from said consumption points upstream from the branching point and the temperature of the waste water in the heat exchanger and for directing the escaping waste water to the heat exchanger if the temperature of the waste water therein is lower than the temperature of the escaping waste water and in the opposite case directing the escaping waste water past the heat exchanger.

2. Apparatus as claimed in claim 1, comprising a further heat exchanger adapted to be supplied with the escaping waste water directed past said first mentioned heat exchanger, a further branching point and a further detector and control device associated with the further heat exchanger for providing the same function in relation thereto as the first mentioned branching point and the first mentioned detector and control device in relation to the first mentioned heat exchanger.

3. Apparatus as claimed in claim 2, wherein the same pipe for cold water from the main supply pipe extends through two heat exchangers.

4. Apparatus as claimed in claim 1, comprising a separate waste pipe for waste water without substantial heat contents, said pipe extending past the heat exchanger or heat exchangers.

5. Apparatus as claimed in claim 1, comprising a collecting receptacle before each heat exchanger.

* * * * *